United States Patent [19]

Buckshaw

[11] 4,399,606
[45] Aug. 23, 1983

[54] METHOD OF MAKING A RESPONSIVE CONTROL DEVICE

[75] Inventor: Thomas M. Buckshaw, Indiana, Pa.

[73] Assignee: Robertshaw Controls Company, Richmond, Va.

[21] Appl. No.: 295,213

[22] Filed: Aug. 21, 1981

Related U.S. Application Data

[62] Division of Ser. No. 122,446, Feb. 19, 1980, Pat. No. 4,300,396.

[51] Int. Cl.³ .............................................. H01F 7/06
[52] U.S. Cl. .................................. 29/602 R; 73/722; 73/728; 336/30
[58] Field of Search ............... 29/602 R; 73/722, 728, 73/708; 336/30

[56] References Cited

U.S. PATENT DOCUMENTS

| 2,740,941 | 4/1956 | Kelly. | |
|---|---|---|---|
| 2,903,678 | 9/1959 | Wills. | |
| 3,142,794 | 7/1964 | Pegram | 73/722 X |
| 3,461,726 | 8/1969 | Ziegler | 73/722 X |
| 3,730,146 | 5/1973 | Moulds et al.. | |
| 3,805,617 | 4/1974 | Kamazuka | 73/728 |
| 3,844,173 | 10/1974 | Rockstead et al. | 73/728 |
| 4,024,483 | 5/1977 | Tomczak et al.. | |
| 4,024,484 | 5/1977 | Tomczak et al.. | |
| 4,042,899 | 8/1977 | Tomczak et al.. | |
| 4,161,886 | 7/1979 | Eshelman et al.. | |
| 4,192,183 | 3/1980 | Avellis et al. | 73/722 X |
| 4,201,240 | 5/1980 | Case. | |
| 4,242,914 | 1/1981 | Eshelman et al. | 336/30 X |

FOREIGN PATENT DOCUMENTS

| 471518 | 12/1975 | U.S.S.R. | 73/728 |
|---|---|---|---|
| 477324 | 12/1975 | U.S.S.R. | 73/722 |

Primary Examiner—Francis S. Husar
Assistant Examiner—Carl J. Arbes
Attorney, Agent, or Firm—Candor, Candor & Tassone

[57] ABSTRACT

A pressure responsive control device having a housing carrying a flexible diaphragm therein that cooperates with the housing to define a pressure chamber therein that is adapted to receive a variable pressure that acts against the diaphragm to position the diaphragm relative to the housing in relation to the value of the pressure, the diaphragm being operatively interconnected to a plunger that follows movement of the diaphragm. The control device has a transducer operatively associated with the plunger to produce an electrical signal in relation to the position of the plunger, the transducer comprising a core carried by the plunger in axially aligned relation therewith and an induction coil carried by the control device and receiving the core therein. A range spring is carried by the housing and is operatively interconnected to the diaphragm to tend to oppose movement of the diaphragm in one direction of movement thereof. The range spring has one end bearing against a calibrating member and the other end bearing against an annular shoulder of the plunger. The induction coil is carried on a spool-like member that has an externally threaded portion, the calibrating member being threaded to the threaded portion to provide for calibrating movement thereof.

11 Claims, 10 Drawing Figures

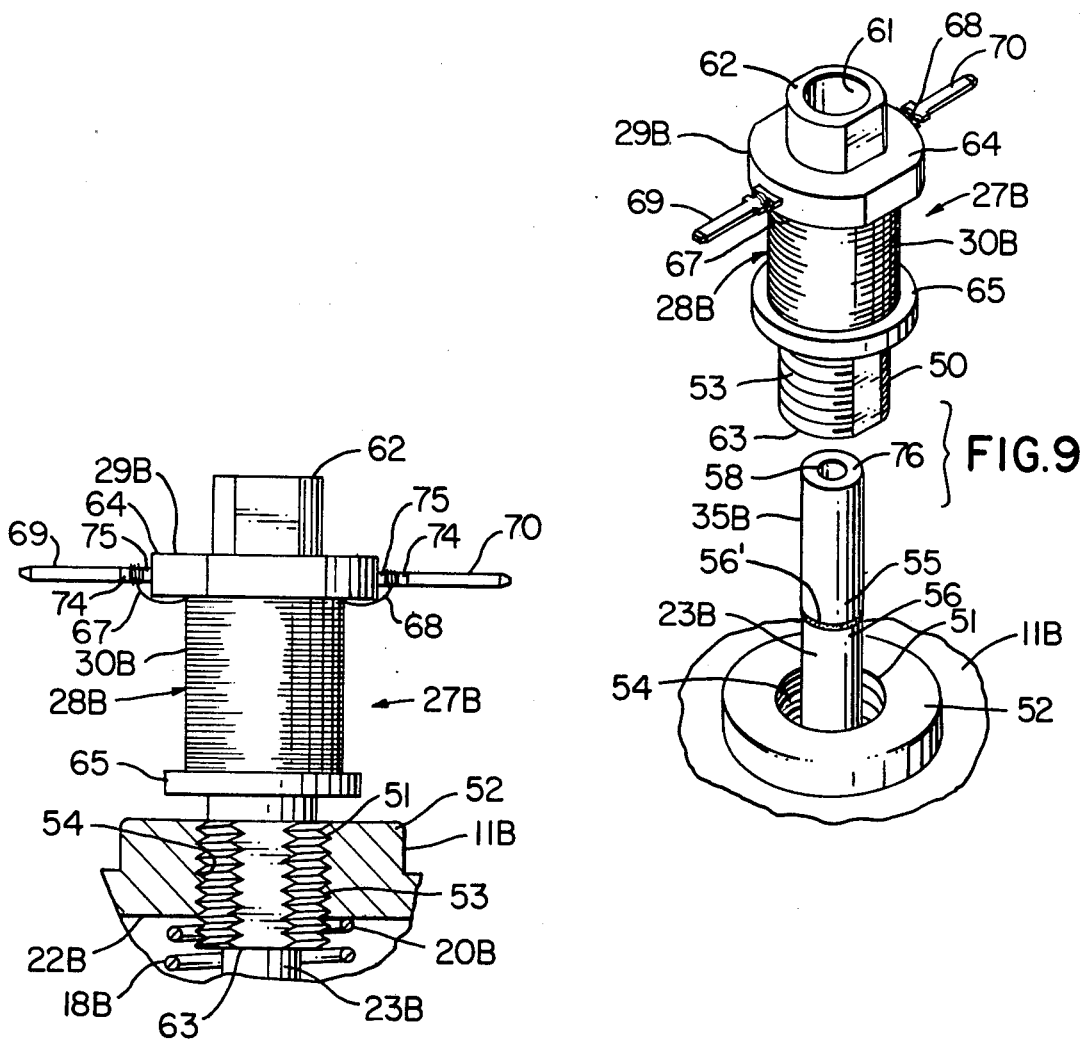
FIG.8
FIG.9
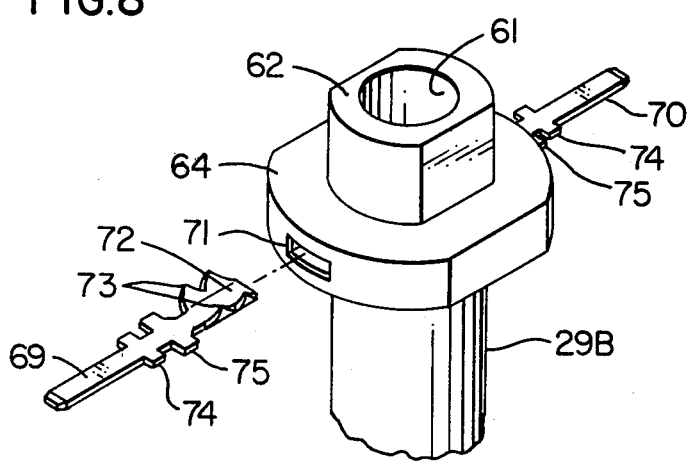
FIG.10

METHOD OF MAKING A RESPONSIVE CONTROL DEVICE

CROSS REFERENCE TO RELATED APPLICATION

This application is a divisional patent application of its copending parent patent application, Ser. No. 122,446, filed Feb. 19, 1980, now U.S. Pat. No. 4,300,396.

BACKGROUND OF THE INVENTION

1. Field of the Invention

This invention relates to an improved pressure responsive control device, such as a water level control device, and to a method of making the same.

2. Prior Art Statement

It is known to the applicant to provide a pressure responsive control device having a housing means carrying a flexible diaphragm means therein that cooperates with the housing means to define a pressure chamber therein that is adapted to receive a variable pressure that acts against the diaphragm means to position the same relative to the housing means in relation to the value of the pressure, the diaphragm means being operatively interconnected to a plunger means that follows the movement of the diaphragm means. The control device has a transducer means operatively associated with the plunger means to produce an electrical signal in relation to the position of the plunger, the transducer means comprising a core member operatively interconnected to the plunger by a pivotally mounted lever arrangement so as to be movable in an induction coil carried by the control device in an offset relation thereto.

For example, see the following U.S. patent:

(1) U.S. Pat. No. 4,201,240 to Case

However, it is also known to arrange an induction coil coaxially with the plunger of the diaphragm means so that the core member will be axially carried by the plunger to move axially in the induction coil means.

For example, see the following six U.S. patents.

(2) U.S. Pat. No. 2,740,941—Kelly
(3) U.S. Pat. No. 3,730,146—Moulds et al.
(4) U.S. Pat. No. 4,024,483—Tomczak et al.
(5) U.S. Pat. No. 4,024,484—Tomczak et al.
(6) U.S. Pat. No. 4,024,899—Tomczak et al.
(7) U.S. Pat. No. 4,161,886—Eshelman et al.

It is also known to provide a float member carrying a core member in axial alignment therewith to be moved in an electrical coil in relation to the liquid level floating the float member.

For example, see the following U.S. patent:

(8) U.S. Pat. No. 2,903,678 to Wills

SUMMARY OF THE INVENTION

One feature of this invention is to provide a pressure responsive control device having improved transducer means operatively associated with the diaphragm plunger means to produce an electrical signal in relation to the position of the diaphragm plunger means.

In particular, a prior known pressure responsive control device utilizes a complicated pivotally mounted lever arrangement to translate motion from the plunger means of the diaphragm means of the pressure responsive control device to a core means disposed in an offset relation to the plunger means so as to be movable in an induction coil means and thereby produce an electrical signal in relation to the position the pressure moved diaphragm means.

However, it was found according to the teachings of this invention, that the transducer means could be uniquely arranged on the control device so that the core means would be carried directly by the plunger means in axially aligned relation therewith to be moveable in an induction coil means that is carried by the control device in a manner to be connected to the plunger means thereof.

Another feature of this invention is to provide such an improved pressure responsive control device wherein the range spring for the diaphragm means thereof can be readily calibrated externally of the housing means.

In particular, it was found according to the teachings of this invention that the range spring can be disposed between the plunger means and a movable calibrating member that is carried by the transducer means external to the housing means of the control device.

Another feature of this invention is to provide such an improved pressure responsive control device wherein the transducer means can be readily calibrated without requiring a calibration of the range spring.

In particular, it was found according to the teachings of this invention that the coil means of the transducer means can be adjustably carried by the control device to provide for calibration of the transducer means.

Accordingly, one embodiment of this invention provides a pressure responsive control device having a housing means carrying a flexible diaphragm means therein that cooperates with the housing means to define a pressure chamber therein that is adapted to receive a variable pressure that acts against the diaphragm means to position the same relative to the housing means in relation to the value of the pressure, the diaphragm means being operatively interconnected to a plunger means that follows the movement of the diaphragm means. The control device has a transducer means operatively associated with the plunger means to produce an electrical signal in relation to the position of the plunger means, the transducer means comprising a core means carried by the plunger means in axially aligned relation therewith and an induction coil means carried by the control device and receiving the core means therein. A range spring is carried by the housing means and is operatively interconnected to the diaphragm means to tend to oppose movement of the diaphragm means in one direction of movement thereof. Calibration means are provided to calibrate the range spring, the calibrating means comprising a movable calibrating member carried by the housing means. The range spring comprises a coiled compression spring having opposed ends. One of the opposed ends of the coiled compression spring bears against the calibrating member and the other of the ends bears against the plunger to be operatively interconnected to the diaphragm means. The plunger has an annular shoulder thereon, the other end of the coiled compression spring bearing against the annular shoulder. The coil means comprises a spool-like member having an electrical coil disposed thereon. A bracket member is secured to the housing means and carries the spool-like member. The spool-like member has an externally threaded portion. The calibrating member is threaded to the threaded portion to provide for calibrating movement thereof.

Another embodiment of this invention provides a pressure responsive control device having a housing means carrying a flexible diaphragm means therein that cooperates with the housing means to define a pressure chamber therein that is adapted to receive a variable pressure that acts against the diaphragm means to position the same relative to the housing means in relation to the value of the pressure, the diaphragm means being operatively interconnected to a plunger means that follows the movement of the diaphragm means. The control device has a transducer means operatively associated with the plunger means to produce an electrical signal in relation to the position of the plunger means, the transducer means comprising a core means carried by the plunger means in axially aligned relation therewith and an induction coil means carried by the control device and receiving the core means therein. The coil means has an adjusting means adjustably carried by the control device to provide calibration means for the transducer means, the adjusting means of the coil means comprising a threaded part thereof. The housing means has a threaded part threadedly receiving the threaded part of the coil means to adjustably carry the coil means. The coil means comprises a spool-like member having an electrical coil disposed thereon, the spool-like member having a pair of electrical terminals carried thereby. The coil has a pair of leads respectively electrically interconnected to the terminals, the spool-like member having a pair of opposed openings formed therein and the terminals respectively being press-fitted into the pair of openings to secure the terminals to the spool-like member.

Accordingly, it is an object of this invention to provide an improved pressure responsive control device having one or more of the novel features of this invention as set forth above or hereinafter shown or described.

Another object of this invention is to provide an improved method of making such a pressure responsive control device, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 8 is a fragmentary partial cross-sectional view taken in the direction of the arrows 8—8 of FIG. 6.

FIG. 9 is a fragmentary exploded perspective view of the parts of FIG. 8.

FIG. 10 is a fragmentary exploded perspective view of the coil means and terminals therefor of the transducer means of the control device of FIGS. 4–9.

DESCRIPTION OF THE PREFERRED EMBODIMENTS

Figure 1:
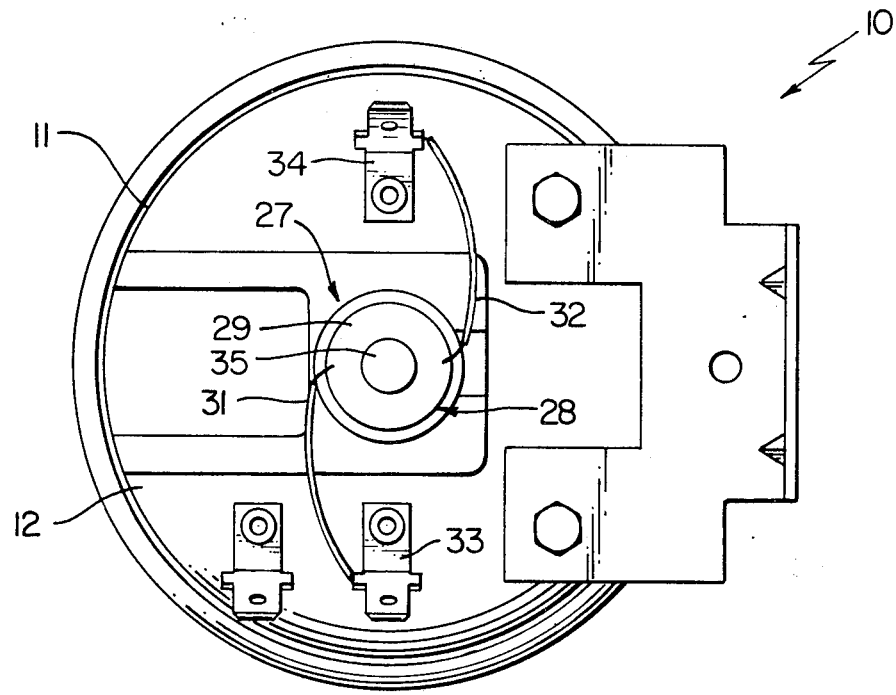
FIG. 1 is a top view of one embodiment of the improved pressure responsive control device of this invention.

While the various features of this invention are hereinafter described and illustrated as being particularly adapted to provide a pressure responsive control device of the water level control type for a laundry machine, it is to be understood that the various features of this invention can be utilized singularly or in any combination thereof to provide a pressure responsive control device for other purposes and apparatus as desired.

Therefore, this invention is not to be limited to only the embodiments illustrated in the drawings, because the drawings are merely utilized to illustrate one of the wide variety of uses of this invention.

Figure 2:
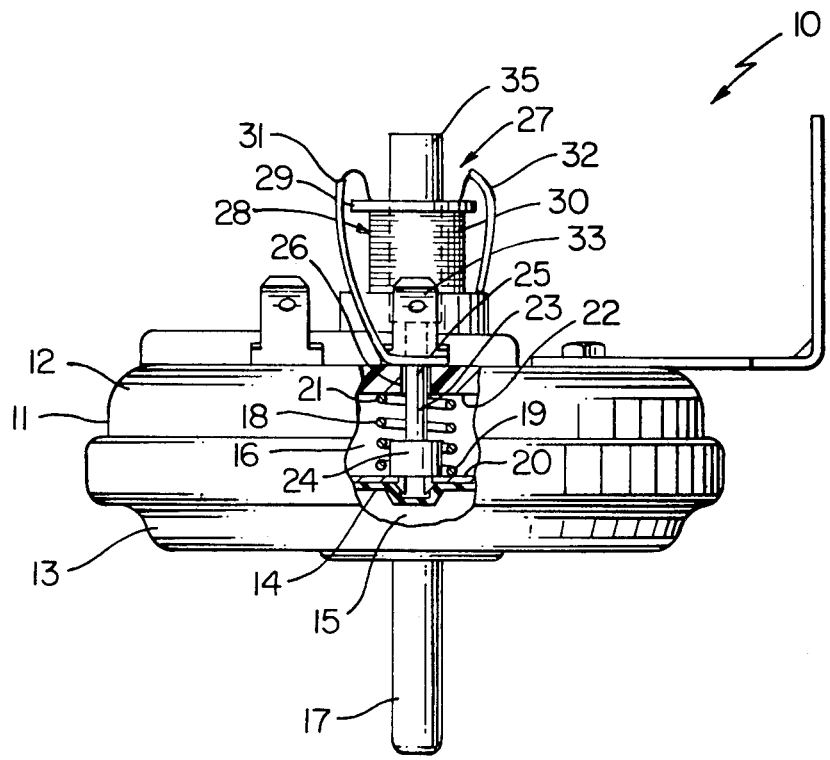
FIG. 2. is a side view of the pressure responsive control device of FIG. 1 with a portion of the housing means broken away.

Referring now to FIGS. 1 and 2, an improved pressure responsive control device of this invention is generally indicated by the reference numeral 10 and comprises a housing means 11 formed from two cup-shaped housing parts 12 and 13 suitably secured together in a manner well known in the art to trap an outer peripheral portion (not shown) of a flexible diaphragm means 14 therebetween so that the flexible diaphragm 14 cooperates with the housing means 11 to define a pair of chambers 15 and 16 separated from each other by the diaphragm means 14.

The chamber 15 of the control device 10 is a sealed pressure receiving chamber that is fluidly interconnected to a nipple means 17 extending from the housing means 11 to be coupled to a flexible conduit (not shown) or the like to receive fluid pressure from any suitable source (not shown) so that the fluid pressure from that source will be directed to the chamber 15 to act against the diaphragm means 14 to tend to cause movement thereof relative to the housing means 11.

For example, if the control device 10 is being utilized as a water level control device for a laundry machine, the pressure being created in the chamber 15 is being produced by the level of the water rising in the laundry chamber of the laundry apparatus and comprising the air in the tube means interconnected to the chamber 15 so that as the pressure value of the pressure in the chamber 15 increases because the level of the water in the laundry machine is increasing, the level of the water in the laundry machine can be controlled by an electrical switch or the like operatively interconnected to the diaphragm means 14 because when the diaphragm means 14 reaches a certain position relative to the housing means 11, the electrical switch can be operated to affect a termination of a water filling operation for the laundry machine.

In any event, it can be seen that a range spring 18 is disposed in the chamber 16 of the housing means 11 and comprises a coiled compression spring having one end 19 bearing against a diaphragm backup plate 20 of the diaphragm means 14 and another end 21 bearing against an interior surface 22 of the housing means 11 so that the force of the compression spring 18 is in a direction to tend to oppose movement of the diaphragm means 14 in an upward direction in the drawings.

A rigid plunger means 23 has a lower end 24 secured to the diaphragm means 14 so that the plunger means 23 will move in unison with the diaphragm means 14, the plunger means 24 being concentrically disposed within the range spring 18 and having its upper end 25 projecting through an opening means 26 formed through the housing means 11 for a purpose hereinafter described.

A transducer means of this invention is generally indicated by the reference numeral 27 and is carried by the control device 10 to produce an electrical signal in relation to the position of the diaphragm means 14 in a manner well known in the art for electrical transducer means so that such electrical signal can be utilized remote from the control device 10 to control any suitable apparatus, such as the water filling means of aforementioned laundry machine to cause the water filling operation thereof to terminate when the signal sent by the transducer means 27 indicates the diaphragm means 14 has been moved to a certain position relative to the housing means 11 and, thus, that the water level of the laundry machine has reached a certain level.

The transducer means 27 comprises an induction coil means 28 having a hollow spool member 29 provided with an electrical coil 30 wound thereon in a conventional manner to have its opposed ends interconnected by suitable electrical leads 31 and 32 to respective terminal means 33 and 34 of the control device 10 to be interconnected in an electrical signal sending circuit in a manner well known in the art.

The transducer means 27 includes a cylindrical core 35 adapted to be moved within the spool member 29 of the coil means 28 to cooperate therewith in producing an electrical signal in relation to the position of the core means 35 relative to the coil means 28 in a manner well known in the art.

The core means 35 of the transducer means 27 is directly interconnected to the end 25 of the plunger means 23 of the control device 10 so as to be in axially aligned relation therewith to move directly in unison with the plunger means 23 as the plunger means 23 moves directly in unison with the diaphragm means 14 in relation to the pressure value of the pressure fluid in the chamber 15.

Thus, it can be seen that the coil means 28 of the transducer means 27 is carried on the housing means 11 of the control device 10 and the core means 35 therefor is directly carried by the plunger means 23 so that the transducer means 27 will produce an electrical signal in relation to the position of the diaphragm means 14 in a manner hereinafter set forth.

Accordingly, it can be seen that the improved pressure responsive control device 10 of this invention can be formed of a relatively few parts and in a simple mannery by the method of this invention to operate in a manner now to be described.

With the diaphragm means 14 disposed in the position illustrated in FIG. 2, the core means 35 of the transducer means 27 is disposed in a certain position relative to the coil means 28 so that the coil means 28 is producing a certain electrical signal that indicates that the diaphragm means 14 is in the position illustrated in FIG. 2.

However, as the value of the pressure fluid in the chamber 15 increases, the resulting pressure differential acting across the diaphragm 14 in opposition to the force of the range spring 18 increases and causes the diaphragm means 14 to move upwardly in FIG. 2 to a new position thereof and such upward movement of the diaphragm means 14 causes the plunger means 23 to move in unison therewith and axially carry the core means 35 upwardly therewith to position the core means 35 in a new position relative to the coil means 28 of the transducer means 27 so that the transducer means 27 will now produce an electrical signal that indicates the diaphragm means 14 is in another certain position thereof.

Conversely, should the pressure differential acting across the diaphragm means 14 decrease because of a decrease in the pressure value of the fluid pressure in the chamber 15, the force of the range spring 18 moves the diaphragm means 14 downwardly and the plunger means 23 follows such movement of the diaphragm means 14 as the plunger means 23 is secured thereto. The downward movement of the plunger means 23 pulls the core means 35 therewith and positions the core means 35 in a new position relative to the coil means 28 so that the transducer means 27 will produce another signal indicating the new position of the diaphragm means 14.

Therefore, it can be seen that the transducer means 27 for the control device 10 will produce an electrical signal that varies according to the position of the diaphragm means 14 relative to the housing means 11 and the position of the diaphragm means 14 relative to the housing means 11 depends upon the pressure value of the fluid pressure in the chamber 15.

Therefore, it can be seen that the improved pressure responsive control device 10 of this invention has the core means 35 for the transducer means 27 thereof uniquely arranged directly on the plunger means 23 for the diaphragm means 14 so as to be axially movable in unison therewith.

Figure 3:
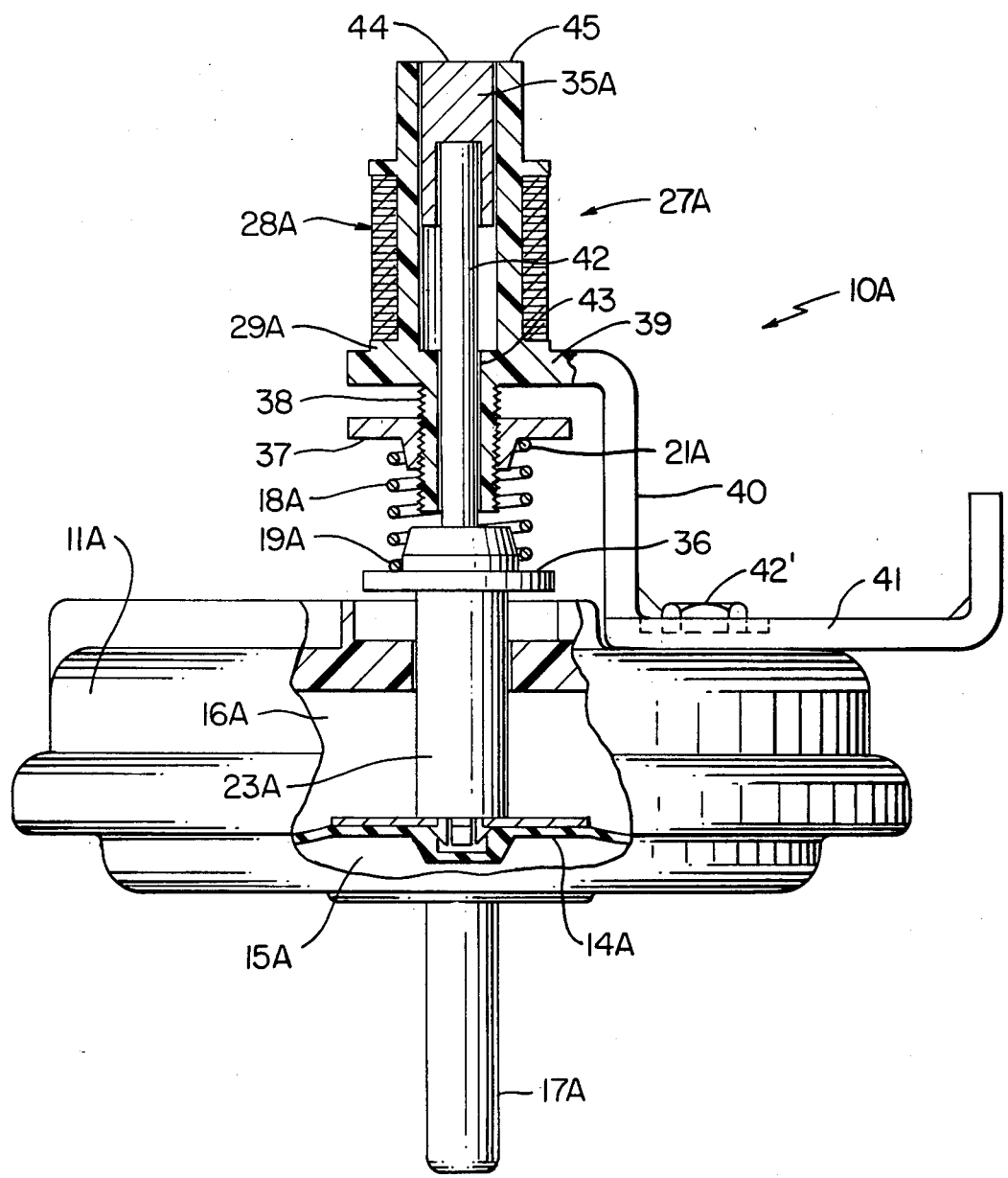
FIG. 3 is an enlarged view similar to FIG. 2 and illustrates another embodiment of the improved pressure responsive control device of this invention.

Another pressure responsive control device of this invention is generally indicated by the reference numeral 10A in FIG. 3 and parts thereof similar to like parts of the control device 10 previously described are indicated by like reference numerals followed by the reference letter "A".

As illustrated in FIG. 3, the control device 10A comprises a housing means 11A having the diaphragm means 14A thereof being positioned by the pressure value of the fluid pressure received in the chamber 15A, the diaphragm means 14A carrying the plunger means 23A so as to be movable in unison therewith. The position of the diaphragm means 14A operates the transducer means 27A for sending an electrical signal in the same manner as the transducer means 27 of the control device 10 previously described.

However, the control device 10A is provided with means for calibrating the range spring 18A thereof and it can be seen that the range spring 18A of the control device 10A is disposed remote from the chamber 16A thereof, the range spring 18A having one end 19A bearing against an annular shoulder means 36 of the plunger means 23A while the other end 21A bears against a movable calibrating member 37 threadedly disposed on an externally threaded extension 38 of the spool member 29A of the coil means 28A of the transducer means 27A.

In this manner, rotation of the calibrating member 37 relative to the housing means 11A of the control device 10A causes the calibrating member 37 to axially move upwardly or downwardly on the threaded extension 38 of the spool 29A, depending upon the direction of rotational movement of the calibrating member 37, to thereby change the force of the compression spring 18A acting downwardly in FIG. 3 on the plunger means 23A to oppose upward movement of the diaphragm means 14A.

The spool means 29A of the transducer means 27A is carried on one end 39 of an L-shaped bracket member 40 having the other end 41 thereof secured to the housing means 11A of the control device 10A by suitable fastening means 42 as desired.

If desired, the bracket means 40 and spool means 29A of the coil means 28A can be integral as illustrated or can be separate parts and suitably secured together.

The plunger means 23A of the control device 10A has its upper end 42 loosely passing through an opening 43 in the threaded extension 38 of the spool member 29A so as to be received in the spool member 29A and be interconnected in any suitable manner to the core means 35A which is adapted to be movable in the coil means 28A depending upon the position of the diaphragm means 14A in the manner previously described.

When it is desired to calibrate the control device 10A, it can be seen that a certain pressure value can be provided in the chamber 15A that is supposed to position the diaphragm means 14A to a certain position thereof if the force of the range spring 10A is at a proper value that will assure that the diaphragm means 14A will be in that certain position when that certain pressure value is in the chamber 15A.

For example, a certain pressure value can be provided in the chamber 15A so that the diaphragm means 14A normally would be moved to a position thereof that would tend to maintain the upper flat surface 44 of the core means 35A flush with the upper surface 45 of the spool 29A in the manner illustrated in FIG. 3 so that if the surface 44 and 45 are not flush when that certain pressure value is provided in the chamber 15A, the operator will rotate the calibrating member 37 to either increase the force of the range spring 18A or decrease the force of the range spring 18A acting downwardly on the diaphragm 14A as the case may be so that the diaphragm 14A will assure the position where the surfaces 44 and 45 are disposed coplanar as illustrated in FIG. 3.

In this manner, the force of the range spring 18A can be readily calibrated for each control device 10A so that thereafter, the transducer means 27A can accurately produce an electrical signal in relation to the position of the diaphragm means 14A relative to the housing means 11A in the manner previously described.

In particular, as the pressure value in the chamber 15A varies, the position of the diaphragm means 14A in the housing means 11A will correspondly vary and the plunger means 23A will move in unison with the diaphragm means 14A and cause axial movement of the core means 35A in unison therewith to position the core means 35A to a new position relative to the coil means 28A whereby the transducer means 27A will produce an electrical signal which will correspond to that new position of the diaphragm means 14A in the manner previously described.

Another pressure responsive control device of this invention is generally indicated by the reference numeral 10B in FIGS. 4–10 and parts thereof similar to the parts of the control devices 10 and 10A previously described are indicated by like reference numerals followed by the reference letter "B".

Figure 5:
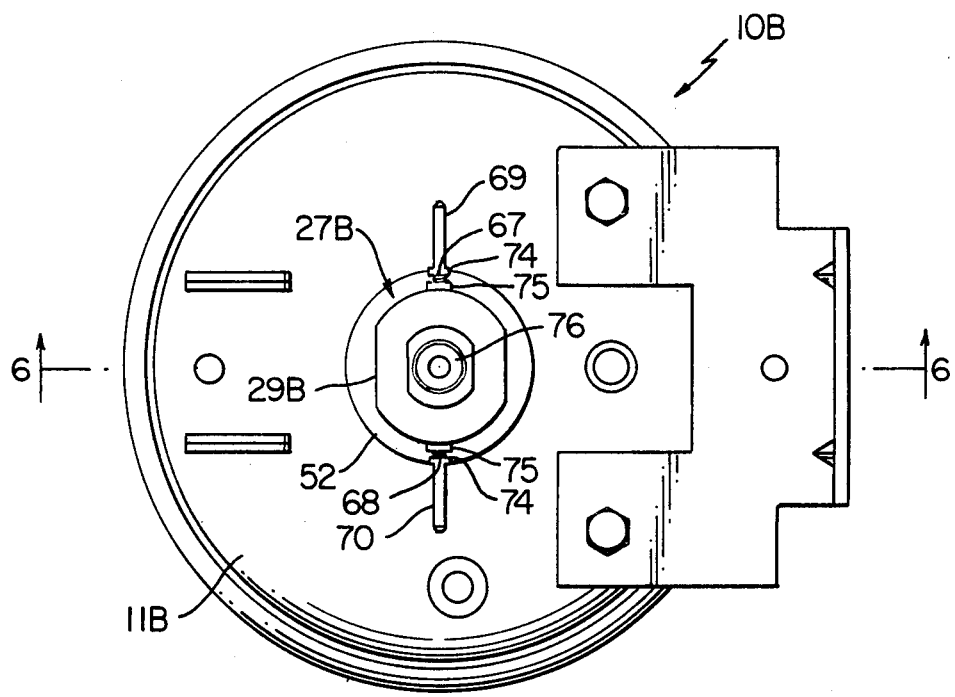
FIG. 5 is a top view of the control device of FIG. 4 and is taken in the direction of the arrows 5—5 of FIG. 4.
Figure 4:
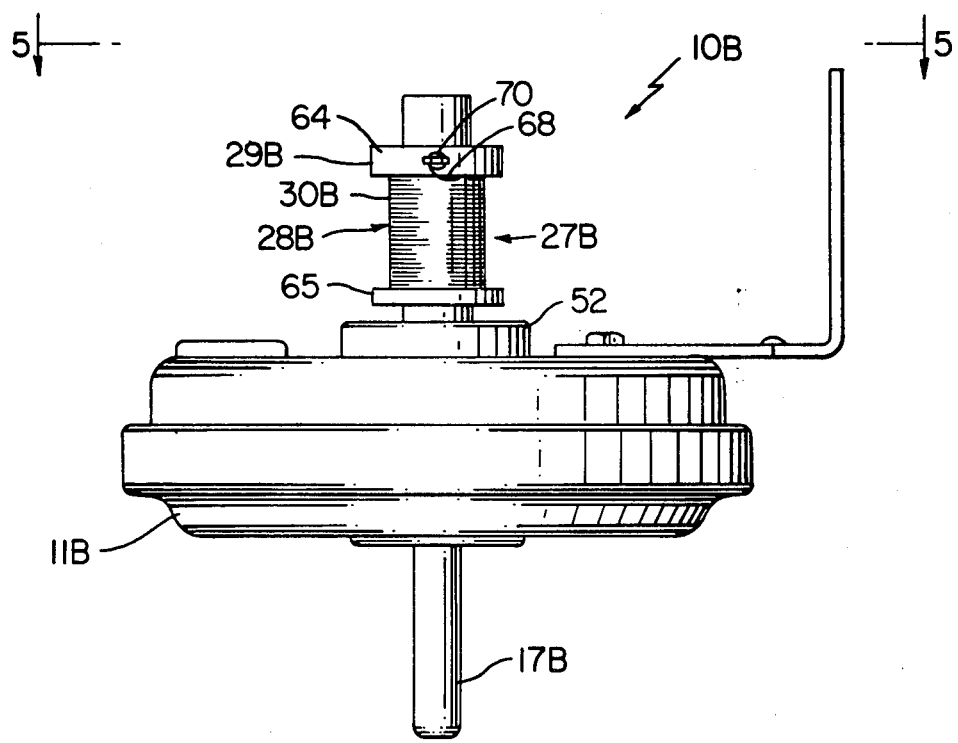
FIG. 4 is a side view similar to FIG. 2 and illustrates another embodiment of the improved pressure responsive control device of this invention.
Figure 6:
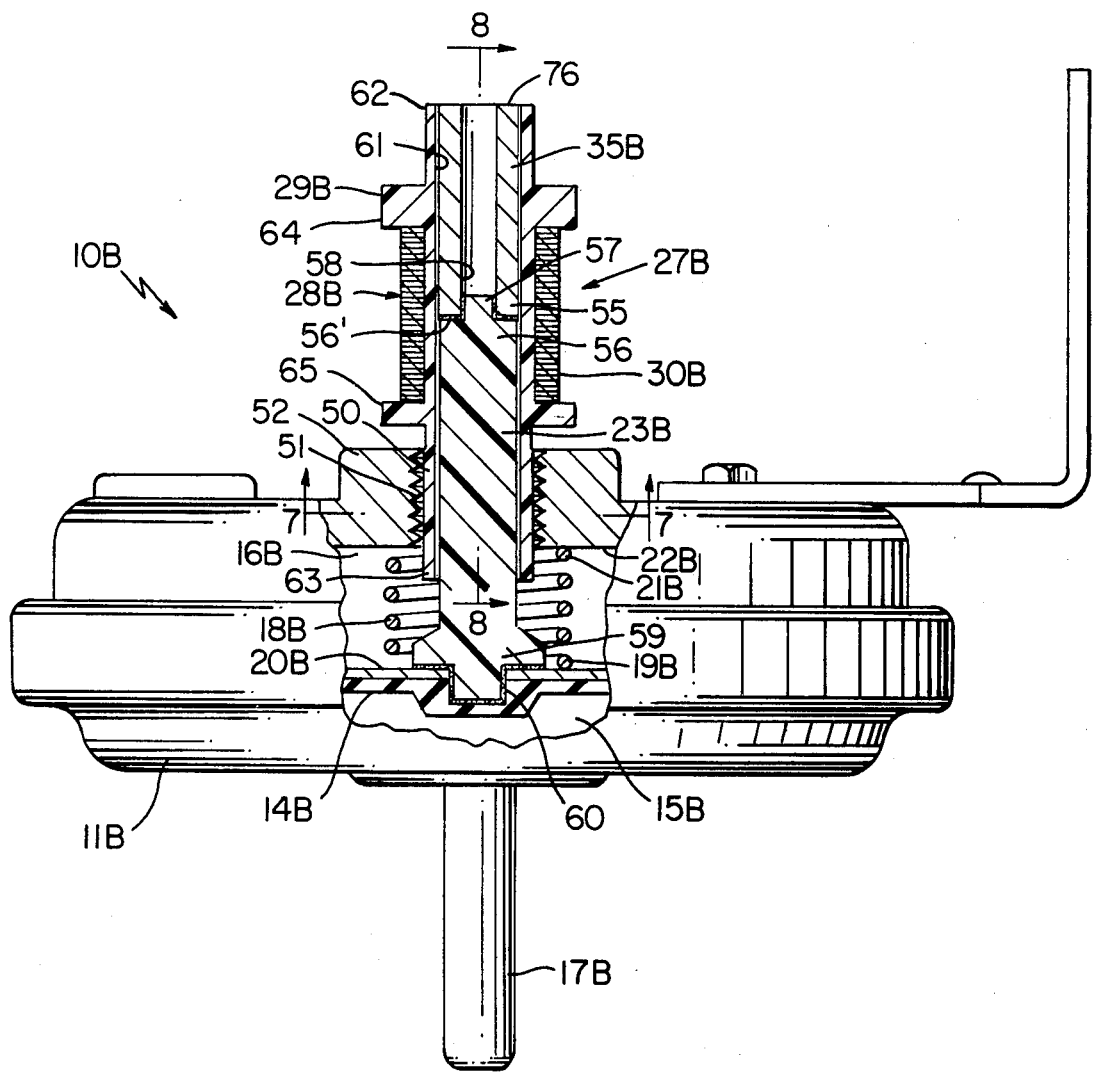
FIG. 6 is an enlarged partial cross-sectional view of the control device of FIG. 5 and is taken in the direction of the arrows 6—6 of FIG. 5.
Figure 7:
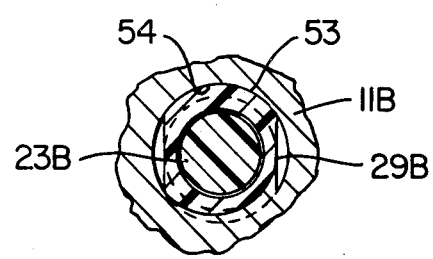
FIG. 7 is a fragmentary cross-sectional view taken on line 7—7 of FIG. 6.

As illustrated in FIGS. 4–6, the control device 10B comprises a housing means 11B having the diaphragm means 14B thereof positioned by the pressure value of the fluid pressure received in the chamber 15B, the diaphragm means 14B carrying the plunger means 23B so as to be movable in unison therewith. The position of the diaphragm means 14B operates the transducer means 27B of the control device 10B in such a manner that the transducer means 27B sends an electrical signal in the same manner as the transducer means 27 and 27A of the control devices 10 and 10A previously described in relation to the position of the diaphragm means 14B.

However, the transducer means 27B of the control device 10B is provided with means for calibrating the same without requiring a calibration of the internal range spring 18B, the range spring 18B having one end 19B disposed against the diaphragm backup plate 20B and the other end 21B disposed against the interior surface 22B of the housing means 11B in a manner similar to the range spring 18 of the control device 10 previously described.

In particular, the coil means 28B of the transducer means 27B of the control device 10B has the spool member 29B thereof provided with a tubular section 50 extending coaxially therewith and from one end thereof to be threadedly disposed in a threaded opening 51 formed through an enlarged section 52 of the housing means 11B, the tubular extension or section 50 of the spool member 29B being provided with external threads 53 which cooperate with internal threads 54 of the housing part 52 so that the spool member 29B can be axially adjustable relative to the housing means 11B through the threaded relation to the threads 53 and 54.

The core 35B of the transducer means 27B can comprise a substantially tubular member that has one end 55 secured to the upper end 56 of the plunger 23B in any suitable manner, such as by adhesive means 56' as illustrated and by having a cylindrical extension 57 of the plunger 23B received in the cylindrical opening 58 passing completely through the core member 35B as illustrated.

In addition, the plunger 23B can have its lower end 59 secured to the diaphragm means 14B by suitable adhesive means 60 as illustrated.

In this manner, the spool member 29B has a substantially cylindrical opening 61 passing completely through the opposed ends 62 and 63 thereof and loosely receives the plunger 23B and its coaxially aligned core member 35B therein to be moved axially relative to the coil means 28B by the diaphragm means 14B to produce the electrical signal in the manner previously set forth.

The spool member, or bobbin, 29B has a pair of spaced disc-like members 64 and 65 disposed intermediate the opposed ends 62 and 63 therefo and between which the electrical coil 30B is adapted to be wound thereon and have the opposed electrical leads 67 and 68 thereof respectively electrically interconnected to a pair of terminals 69 and 70 carried by the disc-like member 64 of the spool 29B.

In particular, the disc-like part 64 of the spool 29 has a pair of opposed openings 71 formed therein and each terminal member 68 or 70 has a barbed end 72 adapted to be press-fitted into its respective opening 71 to be bottomed out therein and be retained thereby by the barbs 73 in a press-fit manner. Of course, the terminal members 69 and 70 could be further secured in the openings 71 by suitable adhesive means, if desired.

In any event, when forming the coil means 28B, the insulated wire of the coil 30B is wound on the spool 29B in the desired number of layers and turns and then the leads 67 and 68 thereof have the insulation thereon stripped to be electrically secured to the terminal member 69 and 70 between spaced tangs 74 and 75 thereof by soldering or the like.

If desired, the terminals 69 and 70 can be sent at an angle relative to the disc 64 in the final form thereof rather than extend horizontally as illustrated in the drawings. For example, the terminals 69 and 70 can be bent at an angle of approximately 60° relative to a horizontal plane.

Also, after the wire coil 30B has been wound from the spool 29B, the same could be coated with a silicone rubber layer or other means to maintain the coil 30B in its coiled condition and thereby prevent accidental unwinding thereof.

When it is desired to assembly the completed coil means 28B of this invention to the housing means 11B to produce the completed control device 10B of this invention, the coil means 28B is telescoped down over the aligned and secured together core means 35B and plunger 23B in the manner illustrated in FIG. 9 to cause the threads 53 of the tubular section 50 to mate with the threads 54 in the opening 51 of the housing means 11B so that the coil means 28B can be threaded into the opening 51 to have its lower end 63 received into the interior space 16B of the housing means 11B and be concentrically disposed within the range spring 18B so as not to interfer with the operation of the range spring 18B.

Before the threaded relation of the coil means 28B with the housing means 11B is finalized by securing the threads 53 and 54 together with suitable adhesive means or the like, the control device 10B is calibrated in a simple and effective manner according to the teachings of this invention.

In particular, an air hose is interconnected to the eyelet or tubular extension 17B of the housing means 11B and air pressure is supplied into the chamber 15B until the air pressure equals the value that the highest water level value that can be obtained in the chamber 15B. At this point, the diaphragm 14B has been moved upwardly against the force of the range spring 18B to the highest water level position for which the control device 10B can be utilized. The spool 29B is then threaded into or out of the base section 52 to obtain the specified inductance value from the transducer means 27B that will indicate the highest water level value for the control device 10B. Such a position of the coil means 28B relative to the core 35B is approximately where the top end 76 of the core member 35B is substantially flush with the end 62 of the spool 29B as illustrated in FIG. 6.

With the transducer 27B now providing the specified inductance for the highest water level setting of the control device 10B, the threads 53 and 54 of the spool 29B and the housing part 52 are secured together by suitable adhesive, such as by applying a lacquer to the threads 53, 54, so that the spool 29B can not be thereafter further adjusted.

Therefore, it can be seen that it is a relatively simple method of this invention to calibrate the control device 10B of this invention without requiring a calibration of the range spring 18B thereof.

The operation of the control device 10B, once the same has been calibrated and finalized in the manner previously described, is substantially the same as the operation of the control devices 10 and 10B previously described and further description of the operation of the control device 10B is unnecessary except to state that the transducer means 27B will produce an electrical signal that is in relation to the position of the diaphragm means 14B relative to the housing means 11B for any desired control purposes.

Accordingly, it can be seen that this invention not only provides an improved pressure responsive control device, but also this invention provides an improved method of making such an improved pressure responsive control device.

While the forms and methods of this invention now preferred have been illustrated and described as required by the Patent Statute, it is to be understood that other forms and method steps can be utilized and still fall within the scope of the appended claims.

What is claimed is:

1. In a method of making a pressure responsive control device having a housing means carrying a flexible diaphragm means therein that cooperates with said housing means to define a pressure chamber therein that is adapted to receive a variable pressure that acts against said diaphragm means to position the same relative to said housing means in relation to the value of said pressure, said diaphragm means being operatively interconnected to a plunger means that follows the movement of said diaphragm means, said control device having transducer means operatively associated with said plunger means to produce an electrical signal in relation to the position of said plunger means, a core means being carried by said plunger means in axially aligned relation therewith, an induction coil means carried by said control device and receiving said core means therein whereby said core means and said induction coil means comprise said transducer means, a range spring being carried by said housing means and being operatively interconnected to said diaphragm means to tend to oppose movement of said diaphragm means in one direction of movement thereof, calibration means to calibrate said range spring, said calibrating means comprising a movable calibrating member carried by said housing means, said range spring comprising a coiled compression spring having opposed ends, one of said ends of said coiled compression spring bearing against said calibrating member and the other of said ends bearing against said plunger to be operatively interconnected to said diaphragm means, said plunger having an annular shoulder thereon, said other end of said coiled compression spring bearing against said annular shoulder, said coil means comprising a spool-like member having an electrical coil disposed thereon, a bracket member being secured to said housing means and carrying said spool-like member, the improvement comprising the steps of forming said spool-like member to have an externally threaded portion, and threading said calibrating member to said threaded portion to provide for calibrating movement thereof.

2. A method of making a pressure responsive control device as set forth in claim 1 and including the step of forming said calibrating member to be located exterior to said housing means.

3. A method of making a pressure responsive control device as set forth in claim 2 and including the step of disposing said shoulder of said plunger and said range spring to be respectively located exterior to said housing means.

4. In a method of making a pressure responsive control device having a housing means carrying a flexible diaphragm means therein that cooperates with said housing means to define a pressure chamber therein that is adapted to receive a variable pressure that acts against said diaphragm means to position the same relative to said housing means in relation to the valve of said pressure, said diaphragm means being operatively interconnected to a plunger means that follows the movement of said diaphragm means, said control device having transducer means operatively associated with said plunger means to provide an electrical signal in relation to the position of said plunger means, a core means being carried by said plunger means in axially aligned relation therewith, an induction coil means carried by said control device and receiving said core means therein whereby said core means and said induction coil means comprise said transducer means, said coil means having adjusting means adjustably carried by said control device to provide calibration means for said transducer means, said adjusting means of said coil means comprising a threaded part thereof, said housing means having a threaded part threadedly receiving said threaded part of said coil means to adjustably carry said coil means, said coil means comprising a spool-like member having an electrical coil disposed thereon, said spool-like member having a pair of electrical terminals carried thereby, said coil having a pair of leads respectively electrically interconnected to said terminals, the improvement comprising the steps of forming said spool-like member to have a pair of opposed openings formed therein, and press-fitting said terminals respectively into said pair of openings to secure said terminals to said spool-like member.

5. A method of making a pressure responsive control device as set forth in claim 4 and including the steps of forming said spool-like member to have opposed ends, and forming said pair of opening to be respectively in one of said opposed ends of said spool-like member.

6. A method of making a pressure responsive control device as set forth in claim 5 and including the step of forming said opposed ends of said spool-like member to respectively define a pair of spaced apart disc-like members.

7. A method of making a pressure responsive control device as set forth in claim 4 and including the step of forming said threaded part of said coil means to comprise a tubular section extending from said spool-like member and be externally threaded.

8. A method of making a pressure responsive control device as set forth in claim 7 and including the step of forming said threaded part of said housing means to comprise an internally threaded opening leading from the exterior of said housing means to the interior thereof.

9. A method of making a pressure responsive control device as set forth in claim 8 and including the step of telescopically threading said tubular section of said coil means in said opening of said housing means so as to have a free end thereof disposed of said interior thereof.

10. A method of making a pressure responsive control device as set forth in claim 9 and including the steps of disposing a range spring to be carried by said housing means and be operatively interconnected to said diaphragm means to tend to oppose movement of said diaphragm means in one direction of movement thereof, and telescoping said free end of said tubular section of said coil means inside said range spring.

11. A method of making a pressure responsive control device as set forth in claim 10 and including the steps of forming said coil means to have a substantially cylindrical opening passing axially therethrough and thereby define said tubular section, and disposing said plunger and said core to be axially movable by said diaphragm means in said cylindrical opening in said coil means.

* * * * *

UNITED STATES PATENT AND TRADEMARK OFFICE
CERTIFICATE OF CORRECTION

PATENT NO. : 4,399,606
DATED : August 23, 1983
INVENTOR(S) : Thomas M. Buckshaw

It is certified that error appears in the above—identified patent and that said Letters Patent is hereby corrected as shown below:

Column 12, line 21, delete "of" and insert --in--.

Signed and Sealed this

Eighteenth Day of September 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,399,606

DATED : August 23, 1983

INVENTOR(S) : Thomas M. Buckshaw

It is certified that error appears in the above-identified patent and that said Letters Patent is hereby corrected as shown below:

The term of this patent subsequent to November 17, 1998 has been disclaimed.

Signed and Sealed this

Eighteenth Day of December 1984

[SEAL]

Attest:

GERALD J. MOSSINGHOFF

Attesting Officer

Commissioner of Patents and Trademarks